(12) United States Patent
Drochon

(10) Patent No.: US 8,235,115 B2
(45) Date of Patent: Aug. 7, 2012

(54) CEMENT SLURRY WITH LOW WATER-TO-CEMENT RATIO

(75) Inventor: Bruno Drochon, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 13/400,104

(22) Filed: Feb. 19, 2012

(65) Prior Publication Data

US 2012/0160489 A1    Jun. 28, 2012

Related U.S. Application Data

(63) Continuation of application No. 11/765,739, filed on Jun. 20, 2007.

(30) Foreign Application Priority Data

Jun. 29, 2006  (EP) ..................................... 06291087

(51) Int. Cl.
  *E21B 33/13*   (2006.01)
  *E21B 33/14*   (2006.01)

(52) U.S. Cl. .................. 166/292; 106/713; 106/737

(58) Field of Classification Search .................. 166/292; 106/713, 737
See application file for complete search history.

(56) References Cited

U.S. PATENT DOCUMENTS

| 3,131,075 | A | 4/1964 | Brooks et al. |
|---|---|---|---|
| 3,197,317 | A | 7/1965 | Patchen et al. |
| 3,558,335 | A | 1/1971 | Messenger |
| 3,832,196 | A | 8/1974 | Broussard et al. |
| 3,902,911 | A | 9/1975 | Messenger |
| 4,252,193 | A | 2/1981 | Powers et al. |
| 4,305,758 | A | 12/1981 | Powers et al. |
| 4,353,746 | A | 10/1982 | Birchall et al. |
| 5,614,307 | A | 3/1997 | Audersen et al. |
| 7,674,332 | B2 | 3/2010 | Roddy et al. |
| 2004/0107875 | A1 | 6/2004 | Drochon et al. |
| 2004/0112255 | A1 | 6/2004 | Bruno et al. |
| 2004/0261993 | A1 | 12/2004 | Gguyen |
| 2005/0077045 | A1 | 4/2005 | Chatterj et al. |
| 2005/0178296 | A1 | 8/2005 | Brothers et al. |
| 2006/0000611 | A1 | 1/2006 | Reddy et al. |
| 2006/0027144 | A1 | 2/2006 | Chatterji et al. |

FOREIGN PATENT DOCUMENTS

| RU | 2057250 | 3/1996 |
|---|---|---|
| RU | 2154730 | 8/2000 |
| WO | 01/87796 | 11/2001 |
| WO | 01/87797 | 11/2001 |

OTHER PUBLICATIONS

V.S. Sanyushevskiy et al.; Reference guide on plugg ng materials; Moscow, Nedra, 1987, p. 241.
Zefirov N. S. Chemical Encyclopedia, Moscow, Big Russian Encyclopedia, 1995, vol. 4, p. 34.

*Primary Examiner* — Paul Marcantoni
(74) *Attorney, Agent, or Firm* — Matthias Abrell

(57) ABSTRACT

A cement slurry comprising a mixture of a cement blend and water, wherein the cement blend comprises at least about 70% by volume of blend of cementitious particulate material and water is present in the mixture in an amount of not more than 50% by volume of the slurry.

20 Claims, No Drawings

CEMENT SLURRY WITH LOW WATER-TO-CEMENT RATIO

RELATED APPLICATION DATA

This application is a continuation of U.S. patent application Ser. No. 11/765,739, filed on Jun. 20, 2007, which claims benefit of European Patent Application Number 06291087.2, filed on Jun. 29, 2006; both of which are incorporated herein by reference in their entirety.

TECHNICAL FIELD

This invention relates to cement slurries suitable for use in underground wells such as oil and gas wells, and in particular relates to slurries that can be prepared with a very low water to cement ratio yet which exhibit rapid development of compressive strength and mechanical properties of the set material.

BACKGROUND ART

In typical well cementing operations, a cement slurry is prepared at the surface and pumped into the well through a liner or casing to fill the annulus between the casing and borehole wall to provide zonal isolation and mechanical support. The cement slurry should preferably present relatively low viscosity and have effectively constant rheological properties while it is being prepared and pumped into the well and placed in the zone that is to be cemented. Once it is in place, the cement will ideally develop high compressive strength in a minimum of time. The time to develop the compressive strength is a function of the temperature but will also depend strongly on the water to cement ratio. It is well known that extended slurries (i.e. slurries having a high water content, typically to achieve reduced density) can take a long time to develop sufficient compressive strength and contribute to increase the rig time taken up in the cementing operation.

Cement slurries in widespread use for oil and gas wells typically have a volume fraction of water (volume of water/total volume of slurry, sometimes called 'slurry porosity') of about 59%, which corresponds to a water to cement weight ratio of about 44 wt %. It is generally accepted that only about 22 wt % of water is needed for the hydration of the Portland cement, the excess water in the slurry causing the development of porosity in the set material. While a water to cement ratio of 44 wt % can lead to a set material having a sufficiently high compressive strength and an acceptable permeability, the same is not true in the case when lighter slurry densities are required.

Lightweight cement slurries are typically designed using one of three technologies: extended slurries, foam cements and engineered particle size systems.

In extended slurries, the slurry density is decreased by increasing the water to cement ratio, typically up to 100 wt % to achieve a slurry density of 12.5 ppg (1503 kg/m$^3$). With such a high amount of water, the development of the compressive strength is slow and the set material exhibits a high permeability and a low compressive strength (less than 1000 psi (0.69 MPa)).

In foam cements, a base slurry having a typical water to cement ratio of 44 wt % is foamed with a gas (usually nitrogen). The water to cement ratio is kept constant when adding the gas. In this case, the rate of development of the compressive strength is not affected compared to the base slurry, but the gas introduced in the material generates porosity leading to a significant increase of the permeability and decrease of the final compressive strength (typically 2200 psi (1.52 MPa) for a 12.5 ppg (1503 kg/m$^3$) slurry).

In engineered particle size systems, such as those described in EP 0621247 A (SOFITECH NV) 26.10.1994 and WO 0109056 A (SOFITECH NV) 08.02.2001, the cement is blended with other particles so that the packing volume fraction of the solids is optimized, which allows reduction of the amount of water needed to maintain good rheological properties. This technology is an improvement compared to the previous ones, as the porosity of the set material remains low whatever the slurry density (which can be controlled by selecting particulate materials of suitable density to form the slurry) and high compressive strength can be achieved even if the water to cement ratio in such slurries is generally not below 50 wt %.

It is an object of the invention to provide a cement slurry system that can be prepared with low water to cement ratios while rapidly developing a high compressive strength.

DISCLOSURE OF THE INVENTION

A first aspect of the invention provides a cement slurry comprising a mixture of a cement blend and water, wherein the cement blend comprises at least about 70% by volume of blend (bvob) of cementitious particulate material and water is present in the mixture in an amount of not more than about 50% by volume of the slurry.

The cementitious materials can comprise Portland cement, slags, fume silica, fly ash, colloidal silica and mixtures thereof.

The cement blend can comprise other particulate materials, for example glass microspheres such as are typically used for control of density.

The slurry preferably contains ultrafine particles having an average particle size of less than 1 micron, for example silica fume or colloidal silica.

A preferred cement blend comprises Portland cement and silica fume and/or colloidal silica in an amount of at least about 60% bvob. In a particularly preferred slurry, the cement blend comprises Portland cement and silica fume and/or colloidal silica in an amount of approximately 100% bvob.

The cement blend typically comprises particulate materials having an average particle size in the range of from about 1 to about 10 microns.

Water is preferably present in an amount of about 35 to about 40% by volume of slurry. A preferred water to cementitious material ratio is in the range of from about 20 to about 40 wt %.

In one preferred embodiment, the cement blend comprises particulate materials in at least two discrete particle size bands. The particulate materials can also be present in at least three discrete particle size bands. The cementitious material can comprise two or three of the particle size bands.

The cement slurry can further comprise additives such as dispersants, anti-freeze, water retainers, setting accelerators or retarders, foam stabilisers, or mixtures thereof.

A second aspect of the invention provides a method of cementing a well, comprising preparing a slurry according to the first aspect of the invention and pumping the slurry into the well.

The step of preparing the slurry preferably comprises selecting solid particulate materials for the cement blend so as to provide a specific slurry density. Alternatively, the method can comprise foaming the cement slurry in the well to adjust its density.

MODE(S) FOR CARRYING OUT THE INVENTION

Slurry compositions according to the invention are typically characterised by a high solid volume fraction, and a solid blend containing a high amount of cementitious materials. Suitable cementitious materials comprise solids containing calcium and/or silica capable to produce hydrates, either with or without reacting with any other component. For example, Portland cement, mixture of Portland cement and slags are considered as cementitious materials as well as fume silica, fly ash and colloidal silica.

A typical blend will be bimodal or trimodal (two or three distinct particle size bands), with cementitious materials present as two or three of these bands in order to maximize the amount of cementitious material. When a blend is mixed with water to a slurry porosity of less that about 50%, a minimum amount of ultra fine particles (typically with an average particle size below 1 micron) is typically required to maintain good mixability.

Compared to the current cement slurries that have a water to cement ratio above 44% weight, the compositions related to the invention can have a water to cement ratio down to as low as about 20% weight, while still exhibiting rapid development of compressive strength and a very high compressive strength.

The invention can provide cement slurries having a very low water/cement ratio (between about 20% and 40% weight). Compared to the three known technologies (foamed cements, extended slurries and engineered particle size distribution), it provides the following benefits:
- faster development of the compressive strength which is very important specifically when the cement slurry has to set a low temperature (deepwater wells for example);
- the possibility to achieve very high compressive strength at low density, even when this type of slurry is foamed, as well as a low permeability;
- the possibility to cover, with a single blend composition, a broad range of slurry densities by foaming or extending it with water, while still providing a set material with a low permeability and high compressive strength.

The present invention provides cement slurries with a very low water to cement ratio, in a broad range of densities, leading to a significant improvement in the development of the compressive strength.

The slurry is composed of a solid blend (that can have bimodal, trimodal or higher particle size bands) and water.

The blend of solids is prepared so that the amount of cement (or cementitious material) in the blend is more than about 70% by volume of blend. The specific gravities of the non-cementitious particles are selected to fit with the slurry density required.

Preferred blend compositions contain Portland cement and silica fume, with a total volume fraction of these components corresponding to more than 60% of the total solid blend.

When ultrafine particles (silica fume or colloidal silica) are present in the blend, it can be mixed with an amount of water that is typically 35 to 50% of the volume of the final slurry. The large amount of solid (between 50 and 65% by volume of slurry), combined with a large amount of cementitious material (more than 50% by volume of blend) provides a very low water to cement ratio (between 20 and 40 weight %). This can allow a rapid development of the compressive strength and a very high compressive strength.

Another embodiment of the invention comprises a bimodal blend containing a large amount of cementitious material (>60% by volume of blend) combined with colloidal silica or fume silica in liquid form as ultrafine particles.

For severe cases such as deepwater cementing where the temperature is very low and a low density is required, one preferred approach is to design a blend with a very high amount of cementitious material (typically between about 60 and 100% by volume of blend) and then to foam a slurry based on this blend in order to reach the low density required. Such a system presents a water to cement ratio as low as about 20% and therefore develops compressive strength rapidly even at very low temperature.

Suitable rheological and mechanical properties are obtained by selecting the size and the volume distribution of the particles in such a manner as to maximize the compactness of the solid mixture.

Formulations made in accordance with the invention develop a compressive strength significantly quicker that than those of cements having the same density. Compressive strengths are very high and porosities very low. As a result, permeability can be smaller by several orders of magnitude.

Slurries according to the invention can include one or more additives of the following types: dispersants, antifreeze, water retainers, cement setting accelerators or retarders, and foam stabilizers. Where such additives are in liquid form (either as provided or dissolved in a liquid carrier) they are considered as part of the liquid fraction.

EXAMPLE 1

The properties of two cement slurries prepared according to the invention are compared to a conventional cement system:

Slurry A (Invention)

A mixture of powders comprising: 55% by volume of Portland Class G, 20% by volume of a mixture of Portland micro-cement and slag having a mean size of about 1.5 μm, and 25% by volume of fume silica is prepared. Water and additives (anti-foaming agent at 0.03 gallons per sack of powder (0.0025 l/kg), and a super-plasticizer based on polynaphthalene sulfonate at 0.4 gallons per sack of powder (0.0334 l/kg)) are mixed with this powder so as to ensure that the volume percentage of liquid in the slurry is 40%. A sack of powder is defined by analogy with sacks of cement as being a sack containing 45.359 kg of mixture, in other words 1 gps=0.0834 liters of additive per kg of mixture.

Slurry B (Invention)

A mixture of powders comprising 55% by volume of Portland Class G, 20% by volume of glass microspheres having a density of 380 kg/m$^3$, and 25% by volume of fume silica is prepared. Water and additives (anti-foaming agent at 0.03 gallons per sack of powder (0.0025 l/kg), and a super-plasticizer based on polynaphthalene sulfonate at 0.3 gallons per sack of powder (0.0250 l/kg) are mixed with this powder so as to ensure that the volume percentage of liquid in the slurry was 40%.

Slurry C (Prior Art)

Portland cement Class G cement is mixed with fresh water, 0.03 gps (0.0025 l/kg) of antifoam, and 0.04 gps (0.0033 l/kg) of dispersant so that the density of the slurry is 15.8 ppg (1900 kg/m$^3$) (porosity 59%)

TABLE 1

| Slurry | A | B | C |
|---|---|---|---|
| Density | 2140 (17.8) | 1830 (15.2) | 1900 (15.8) |

TABLE 1-continued

| Slurry | A | B | C |
|---|---|---|---|
| Slurry Porosity | 40% | 40% | 59% |
| Water to Cement ratio | 23% | 29% | 44% |
| CS | 138 (20000) | 114 (16500) | 34.5 (5000) |

The densities are expressed in kg/m$^3$ (and in pounds per gallon in parentheses). CS means compressive strength after 6 days for cement set at ambient pressure and 60 C, and it is expressed in MPa (and in pounds per square inches in parentheses).

It can be seen that for the slurries A and B, compressive strengths are much higher than for slurry C due lower water to cement ratios.

EXAMPLE 2

The properties of foamed cement slurries prepared according to the invention are compared to conventional foamed cement systems:

Base Slurry A (Invention)

A mixture of powders comprising 55% by volume of Portland Class G, 20% by volume of glass microspheres having a density of 380 kg/m$^3$, and 25% by volume of fume silica is prepared. Water and a super-plasticizer based on polynaphthalene sulfonate at 0.3 gallons per sack of powder (0.0250 l/kg)) are mixed with this powder so as to ensure that the volume percentage of liquid in the slurry was 40%.

The slurry is foamed with various quantities of foam to obtain slurries whose final densities are 1440 kg/m$^3$, 1278 kg/m$^3$ and 1150 kg/m$^3$.

Slurry B (Prior Art)

Portland cement Class G cement is mixed with fresh water and 0.04 gps (0.0033 l/kg) of dispersant so that the density of the slurry is 15.8 ppg (1900 kg/m$^3$)(porosity 59%).

The slurry is foamed with various quantities of foam to obtain slurries whose final densities are 1440 kg/m$^3$, 1278 kg/m$^3$ and 1150 kg/m$^3$.

TABLE 2

| Base Slurry | A | | | B | | |
|---|---|---|---|---|---|---|
| Slurry Porosity | 40% | | | 59% | | |
| Foam Quality | 21% | 30% | 37% | 24% | 33% | 39% |
| Density | 1440 (12) | 1278 (10.6) | 1150 (9.6) | 1440 (12) | 1278 (10.6) | 1150 (9.6) |
| Water/Cement ratio | 29% | | | 44% | | |
| CS | 38 (5500) | 24 (3500) | 19 (2700) | 14 (2000) | 9 (1300) | 7 (1000) |

The densities are expressed in kg/m$^3$ (and in pounds per gallon in parentheses). CS means compressive strength after 10 days for cement set at ambient pressure and temperature, and it is expressed in MPa (and in pounds per square inches in parentheses).

It can be seen that for the slurries prepared in accordance with the invention, compressive strengths are significantly higher than conventional foamed systems for the same slurry density due a lower water to cement ratio.

EXAMPLE 3

The properties of three cement slurries prepared according to the invention are shown in Table 3 below. They show the wide range of slurry densities that can be covered by the concept and the remarkable mechanical properties of the set materials.

Slurry A (Invention)

A mixture of powders comprising 35% by volume of Portland Class G, 40% by volume of glass microspheres having a density of 380 kg/m$^3$, 25% by volume of fume silica is prepared. Water and a super-plasticizer based on polynaphthalene sulfonate at 0.2 gallons per bag of powder (0.0167 l/kg)) are mixed with this powder so as to ensure that the volume percentage of liquid in the slurry is 40%.

Slurry B (Invention)

A slurry similar to slurry A is prepared but without antifoam agent. This base slurry is then foamed with a quantity of foam to obtain a slurry whose final density is 970 kg/m$^3$.

Slurry C (Invention)

A mixture of powders comprising 50% by volume of Portland Class G, 25% by volume of glass microspheres having a density of 380 kg/m$^3$, 25% by volume of fume silica is prepared. Water and an anti-foaming agent at 0.03 gallons per sack of powder (0.0025 l/kg) are mixed with this powder so as to ensure that the volume percentage of liquid in the slurry is 60%.

TABLE 3

| Base Slurry | A | B | C |
|---|---|---|---|
| Base Slurry Porosity | 40% | 40% | 60% |
| Foam Quality | 0% | 35% | 0% |
| Slurry Density | 1520 (12.7) | 970 (8.1) | 1500 (12.5) |
| Water/Cement ratio | 40% | 40% | 70% |
| CS | 69 (10000) | 11 (1600) | 17 (2500) |

The densities are expressed in kg/m$^3$ (and in pounds per gallon in parentheses). CS means compressive strength after 10 days for cement set at ambient pressure and temperature, and it is expressed in MPa (and in pounds per square inches in parentheses).

As can be seen from the preceding examples, considerable changes can be made to the slurries according to the invention while still remaining within the scope of the inventive concept. Other changes than those described can also be made.

The invention claimed is:

1. A method of cementing a well, comprising
   (i) preparing a slurry comprising a mixture of a cement blend and water, wherein the cement blend comprises at least 90% cementitious particulate material by volume of blend, water is present in an amount greater than 25% and up to about 40% weight of cementitious material, and the cement blend comprises particulate materials in at least two discrete particle-size bands; and
   (ii) pumping the slurry into the well.

2. The method of claim 1, wherein the cementitious material comprises Portland cement and silica fume.

3. The method of claim 1, wherein the slurry contains ultrafine particles having an average particle size of less than 1 micron.

4. The method of claim 3, wherein the ultrafine particles comprise silica fume.

5. The method of claim 4, wherein the cement blend comprises Portland cement and silica fume in an amount of at least about 60% by volume of blend.

6. The method of claim 5, wherein the cement blend comprises Portland cement and silica fume in an amount of approximately 100% by volume of blend.

7. The method of claim 1, wherein the cement blend comprises particulate materials having an average particle size in the range of from about 1 to about 10 microns.

8. The method of claim 1, wherein water is present in an amount of from about 35% to about 40% by volume of slurry.

9. The method of claim 1, wherein two of the particle-size bands comprise cementitious material.

10. The method of claim 1, wherein the cement blend comprises particulate materials in at least three discrete particle-size bands.

11. The method of claim 10, wherein two of the particle-size bands comprise cementitious material.

12. The method of claim 10, wherein three of the particle-size bands comprise cementitious material.

13. The method of claim 1, further comprising dispersants, anti-freeze, water retainers, setting accelerators or retarders, foam stabilisers, or mixtures thereof.

14. The method of claim 1, further comprising the step of foaming the cement slurry in the well.

15. A method of treating a well, comprising
(i) preparing a slurry comprising a mixture of a cement blend and water, wherein the cement blend comprises at least 90% cementitious particulate material by volume of blend, water is present in an amount greater than 25% and up to about 40% weight of cementitious material, and the cement blend comprises particulate materials in at least two discrete particle-size bands; and
(ii) pumping the slurry into the well.

16. The method of claim 15, wherein the cementitious material comprises Portland cement and silica fume.

17. The method of claim 15, wherein the slurry contains ultrafine particles having an average particle size of less than 1 micron.

18. The method of claim 15, wherein the cement blend comprises particulate materials in at least three discrete particle-size bands.

19. The method of claim 15, further comprising dispersants, anti-freeze, water retainers, setting accelerators or retarders, foam stabilisers, or mixtures thereof.

20. The method of claim 15, further comprising the step of foaming the cement slurry in the well.

* * * * *